(12) United States Patent
Miller (10) Patent No.: US 7,866,919 B2
(45) Date of Patent: Jan. 11, 2011

(54) SYSTEM AND METHOD FOR CONTROLLING WATER FLOW BETWEEN MULTIPLE RESERVOIRS OF A RENEWABLE WATER AND ENERGY SYSTEM

(75) Inventor: Allen David Miller, Palmer Lake, CO (US)

(73) Assignee: Natural Energy Resources Company, Palmer Lake, CO (US)

( * ) Notice: Subject to any disclaimer, the term of this patent is extended or adjusted under 35 U.S.C. 154(b) by 295 days.

(21) Appl. No.: 12/102,651

(22) Filed: Apr. 14, 2008

(65) Prior Publication Data

US 2008/0253837 A1 Oct. 16, 2008

Related U.S. Application Data

(60) Provisional application No. 60/911,451, filed on Apr. 12, 2007.

(51) Int. Cl.
*E02B 9/02* (2006.01)
*E02B 13/00* (2006.01)

(52) U.S. Cl. .............................. 405/80; 405/51; 405/53; 405/75

(58) Field of Classification Search .................. 405/36, 405/51–53, 55, 75, 80; 210/747, 170.01
See application file for complete search history.

(56) References Cited

U.S. PATENT DOCUMENTS

| | | | |
|---|---|---|---|
| 2,962,599 A | | 11/1960 | Pirkey |
| 3,863,605 A | * | 2/1975 | Gallup ........................ 119/229 |
| 3,939,356 A | | 2/1976 | Loane |
| 4,109,160 A | | 8/1978 | Goto et al. |
| 4,117,685 A | * | 10/1978 | Skaife .......................... 405/36 |
| 4,132,901 A | | 1/1979 | Crausbay |
| 4,159,188 A | | 6/1979 | Atencio |
| 4,192,627 A | | 3/1980 | Casebow |

(Continued)

FOREIGN PATENT DOCUMENTS

JP 57-131869 8/1982

(Continued)

OTHER PUBLICATIONS

"Blenheim-Gilboa Pumped Storage Power Project," available at http://www.nypa.gov/facilities/blengil.htm, printed Jul. 13, 2010, copyright 1996-2010, 2 pages.

*Primary Examiner*—Tara Mayo-Pinnock
(74) *Attorney, Agent, or Firm*—Sheridan Ross P.C.

(57) ABSTRACT

A high altitude pumped-storage system for selectively integrating, storing, and distributing water and energy to increase the regional productivity of existing and future water and energy resources throughout multiple river basins is disclosed. This system addresses in part the increased requirement of supplying energy demands from a renewable energy source, such as wind, solar, or water generated power. The system includes at least one primary reservoir connected to multiple secondary reservoirs by conduits. The system allows for selectively distributing water and energy between secondary reservoirs and at least one primary reservoir. The system may comprise one or more hydroelectric power generation facilities. A method for increasing the regional efficiency of existing and future systems for producing, storing, and delivering energy from sources such as hydroelectric, wind and solar power from the water collected by the system described herein is also disclosed.

16 Claims, 4 Drawing Sheets

U.S. PATENT DOCUMENTS

| | | | |
|---|---|---|---|
| 4,279,539 A | 7/1981 | Gutierrez Atencio | |
| 4,282,444 A | 8/1981 | Ramer | |
| 4,341,490 A | 7/1982 | Keeling | |
| 4,443,707 A | 4/1984 | Scieri et al. | |
| 4,876,004 A * | 10/1989 | Verhoeff | 210/170.08 |
| 4,919,568 A * | 4/1990 | Hurley | 405/43 |
| 4,965,998 A | 10/1990 | Estigoy et al. | |
| 5,160,214 A * | 11/1992 | Sakurai et al. | 405/36 |
| 5,192,426 A * | 3/1993 | DeCoster et al. | 210/117 |
| 5,228,802 A * | 7/1993 | Kuwabara et al. | 405/41 |
| 5,249,887 A * | 10/1993 | Phillips | 405/36 |
| 5,360,290 A * | 11/1994 | Yamada et al. | 405/52 |
| 5,389,821 A | 2/1995 | Moulliet | |
| 6,000,880 A * | 12/1999 | Halus | 405/52 |
| 6,216,463 B1 * | 4/2001 | Stewart | 60/641.2 |
| 6,396,162 B1 | 5/2002 | Carrillo | |
| 6,445,078 B1 | 9/2002 | Cieslak, Jr. | |
| 6,792,753 B2 | 9/2004 | Hastings | |
| 6,798,080 B1 | 9/2004 | Baarman et al. | |
| 6,862,886 B2 * | 3/2005 | Stewart | 60/641.2 |
| 6,996,937 B2 | 2/2006 | Halloran | |
| 2005/0034452 A1 | 2/2005 | Davis | |

FOREIGN PATENT DOCUMENTS

| | | |
|---|---|---|
| LV | 12545 B | 2/2001 |
| UA | 61220 A | 11/2003 |
| WO | WO 97/21922 | 6/1997 |
| WO | WO 01/96736 A1 | 12/2001 |

\* cited by examiner

SYSTEM AND METHOD FOR CONTROLLING WATER FLOW BETWEEN MULTIPLE RESERVOIRS OF A RENEWABLE WATER AND ENERGY SYSTEM

CROSS REFERENCE TO RELATED APPLICATION

The present application claims the benefit of U.S. Provisional Application No. 60/911,451 filed on Apr. 12, 2007, the entire disclosure of which is incorporated herein by reference in its entirety.

FIELD OF THE INVENTION

The present disclosure generally relates to pumped-storage systems and methods for storing and diverting water between a plurality of locations, such as reservoirs, and for providing renewable water and hydroelectric power, when and where needed during periods of peak demand. More specifically, this disclosure relates to a system for collecting and selectively distributing water for meeting regional water and/or power requirements, and a method for improving the efficiency of regional water storage systems and production of renewable energy from such water storage systems.

BACKGROUND OF THE INVENTION

Population growth around the world, and particularly in certain parts of the United States, has created an escalating renewable energy and water shortage crisis. Currently, over twenty states have implemented renewable energy standards that require at least a certain amount of energy to come from renewable sources, such as hydroelectric power generated from renewable water sources. On a federal level, the U.S. Congress has presented bills in the past requiring a 20% renewable energy use by the year 2020. (See, http://mariasurmamanka.greenoptions.com/2007/02/28/congress-to-pass-federal-renewable-energy-standard/). Colorado is one of those states that has independently enacted this stringent renewable energy requirement, with the expectation of having 20% of the state's entire energy use supplied from renewable energy sources by the year 2020. That legislation was passed in 2007 as Colorado House Bill 1281. (See, http://www.colorado.gov/govemor/press/march07/renewable-energy.html).

Despite the current movement supporting renewable energy sources, many legislators and policy-makers are attempting to meet this requirement by passing further legislation that relate solely to wind and solar power generation, and do not address renewable energy produced from water. One example is Colorado House Bill 1222, presented by the Colorado State Legislature, which requires the state to expand its wind and solar generation infrastructure, but does not address the significant shortcomings with respect to continuous collection and storage of such energy. This sentiment has been embodied in a number of recent articles in The Denver Post, including one editorial titled "*Wind Farm a good start*", published on Oct. 4, 2007, the entirety of which is incorporated herein by reference. In summary, given the over-reliance on wind and solar generated power, which is difficult to store and is unreliable as it occurs sporadically, there needs to be a greater emphasis on the use of water to meet the states' and the country's renewable energy goals.

Current methods for accumulating and preserving water supplies include storage systems, such as dams, levies, basins, wells and reservoirs. However, these storage systems are frequently located on-river, at low or medium-elevations, and without the ability to efficiently distribute their water supply in multiple directions to accommodate for varying regional growth and seasonal demands, as well as unpredictable climate change conditions. These low altitude systems are also subject to relatively high evaporative losses. There are certain advantages, including economic and environmental advantages, to collecting and storing water at high elevations during periods of high water run-off from spring snowmelt and summer storms. Naturalists have known that high-altitude beaver dams have protected and enhanced river valleys and environments for thousands of years, and many hydrologists recognize that headwater reservoirs have multiple use and reuse advantages for entire river systems over comparable down river storage facilities.

Unfortunately, the latent multiple economic and environmental advantages of headwater reservoirs for multiple river systems have not been recognized and applied in mountainous headwater areas. Institutional barriers and potential technical constraints have historically worked against integrated regional water resource planning with respect to high-altitude pumped-storage capabilities. As a result, most reservoirs in the United States are located down-river at relatively low and medium-altitude sites. These traditional dams, on free flowing rivers frequently have limited economic benefits for human needs, and may cause serious environmental impact.

Unfavorable benefit vs. impact realities are responsible for recent extended moratoriums against most new water storage projects. As a result, renewable water and energy shortages are now commonplace, and plans for future needs are problematic. The breakthrough regional water and energy productivity advancements from this integrated high-altitude pumped-storage invention can be used to quickly recover from moratoriums and shortage, while providing for future needs.

Furthermore, recent Department of Interior and Bureau of Reclamation dam safety studies have predicted that certain dams located in the western United States could suddenly fail because their structures are not designed to safely pass floods above 55% of today's projected Probable Maximum Flood ("PMF") criteria. As a result of the potential for catastrophic failure, both lives and property interests are at risk. By contrast, an off-river, high-altitude storage reservoir would not require an emergency spillway, because the reservoir's upstream drainage basin is generally relatively small, and the dam can be designed to provide a greater freeboard capacity. The high-altitude storage reservoir could be connected to several downstream reservoirs by pumping means, which would allow increased water levels at those downstream reservoirs to be reduced by diverting water to the high-altitude storage reservoir. This reduces the potential for sudden and unexpected failure of the dams, mitigating or preventing risk of loss during high run-off periods or floods.

A centrally located, high altitude storage reservoir would also provide a positive environmental and economic impact as a source of both renewable energy and water. Such a high-altitude reservoir does not require geographical constraints such as being located on-river or in a discrete river basin. The centrally located, high-altitude reservoir's large storage capacity, coupled with high-volume pumping capabilities, allow such a flexible system to be operated more efficiently than lower altitude, down river reservoirs, and further reduce catastrophic flood risks and erosion risks such as during periods of high run-off to downstream residents and properties.

There are several known systems for distributing water between reservoirs. For example, the Blenheim-Gilboa Pumped Storage Power Project, located at http://www.nypa.gov/facilities/blengil.htm discloses a reservoir system capable of generating electricity in peak demand periods by drawing water from Schoharie Creek and recycling it between two huge reservoirs. However, this abstract fails to disclose distributing water from multiple lower elevations to a centrally located storage reservoir at a higher elevation for increasing the potential of both water and hydroelectric energy.

WIPO Publication No. WO9721922 to Curtui, entitled "Total Electric Water System," published Jun. 19, 1997 ("the '922 Publication"), discloses a reservoir system with multiple segments of piping placed in series, wherein a lower elevation is reached by distributing water from a higher elevation, and the water is directed out of the pipeline system and becomes a source of water at a lower elevation or is directed to areas with a water deficit. The pipeline system is made up from one or more units set downwardly each unit in connection with the other. However, the '922 Publication does not disclose distributing the water for meeting seasonal/non-seasonal water and electrical power generation demands, and otherwise has the same shortcomings as the Blenheiim-Gilboa Project abstract as outlined above.

Ukrainian Patent No. UA 61,220 to Arkadiiovy, issued Nov. 17, 2003, "the '220 patent" discloses a hydro-energy complex for mountain regions, which includes a cascade of hydroelectric power plants with multiple water reservoirs placed in series in a valley where a mountain river flows, and also coupled with multiple hydroelectric power plants. However, the '220 patent fails to disclose a system or method for returning water from downstream reservoirs to upstream reservoirs during low demand periods, or diverting water between several mountain-region valleys and/or river basins.

U.S. Pat. No. 4,192,627 to Casebow entitled "Apparatus for Generating Electrical Power" issued Mar. 11, 1980 ("the '627 patent"), discloses a system designed to maintain constant head pressure to achieve continuous electrical power generation. While the '627 patent does disclose interconnected reservoirs for the purpose of generating electrical power, it does not describe a system or method designed to selectively divert water to maximize electrical power generation and water supply efficiencies throughout the region's multiple river basins.

Thus, these and other problems presently exist in the art, resulting in the need for a system and method for efficiently producing a renewable water, and energy source from a collected high-altitude water supply, which may be distributed based on daily, seasonal, cyclic and/or regional water and energy related demands, and which further accomplishes the objectives described in the following Summary of the Invention.

SUMMARY OF THE INVENTION

The present disclosure relates to a system and method for selectively distributing water across a plurality of water storage reservoirs, which comprises at least one high elevation reservoir and one or more lower elevation reservoirs, with reversible pumped-storage facilities and conduits connecting lower elevation reservoirs to at least one high elevation reservoir. The system and method according to one embodiment further comprises the use of stored renewable water and energy to increase the productivity reliability, and quality of existing and future lower-elevation reservoirs and other facilities, with regulated flows via gravity conduits, siphons, and rivers to integrate and optimize productivity of perishable water and energy resources.

In a preferred embodiment, one objective of the system and method is to improve the productivity of renewable energy and water resource systems throughout a particular region's water collection area. In one embodiment, at least one high elevation reservoir may be located in a strategic location relative to a plurality of downstream or lower elevation reservoirs so that water may be selectively distributed between the high elevation reservoir and the lower elevation reservoirs. One strategic location for such a high elevation reservoir would be a high-altitude location proximate to the North American Continental Divide. Such a system has multiple benefits relating to water collection and storage, integrated regional distribution, preserve for optimal economic and environmental benefits, as will be better understood after reading the Detailed Description below.

It is thus one aspect of the present disclosure to provide a system for controlling and maximizing the efficiency of water collected in a region by connecting multiple lower elevation reservoirs with at least one high elevation reservoir via multiple conduits, and providing pumping means for selectively distributing water between the lower elevation reservoirs and the at least one high-elevation reservoir to accommodate regional daily, seasonal, and cyclic water supply and/or energy demands.

It is another aspect of the present disclosure to provide a system for producing a renewable energy source from the replenishable supply of water collected during periods of high run-off, and using the potential hydroelectric energy from the stored water during periods of high electrical demand, such as peak electrical demand periods, including summer cooling and winter heating months when high-value blackout protection is needed throughout the region's power grid.

It is another aspect of the present disclosure to provide a system for storing and distributing water via conduits between the plurality of reservoirs to reduce the risk of loss caused by flooding, or during periods of high run-off, in part by maintaining a larger volume of water storage in the high-altitude reservoir and in part by reducing the level of water in the lower elevation reservoirs. High altitude multi-basin storage can also be used as backup to indirectly increase flood control capabilities of lower reservoirs, when probable maximum flood (PMF) conditions warrant emergency releases.

It is yet a further aspect of the present disclosure to provide a system for distributing water collected between lower elevation reservoirs and at least one high elevation reservoir to reduce the regional amount of evaporative and/or other water loss occurring at each of the lower elevation reservoirs.

Thus, in one embodiment of the present disclosure, a system is provided for collecting, storing and selectively distributing water between a plurality of reservoirs comprising:

at least one main reservoir at a first elevation;

a plurality of secondary reservoirs located at elevations lower than the first elevation;

a plurality of conduits connecting the at least one main reservoir and the plurality of secondary reservoirs;

pumping means for distributing water through the plurality of conduits;

generation means for generating power from water distributed to/from the at least one main reservoir and/or from water distributed to/from the plurality of secondary reservoirs;

wherein the water in the at least one main reservoir is selectively distributed to the plurality of secondary reservoirs to provide water and/or generate power; and wherein the water in the plurality of secondary reservoirs is selectively distributed to the main reservoir to conserve water and reduce water levels at the plurality of secondary reservoirs.

According to another embodiment, a system for regulating water is disclosed, comprising:

at least one first reservoir at a first elevation;

a plurality of secondary reservoirs at elevations lower than the first elevation;

at least one conduit connecting the at least one first reservoir and the plurality of secondary reservoirs;

at least one pumping means associated with each of the plurality of secondary reservoirs for selectively distributing water from each of the plurality of secondary reservoirs to the at least one first reservoir;

at least one distribution means associated with each of the at least one conduits for selectively distributing water from the at least one first reservoir to the plurality of secondary reservoirs;

wherein the system for regulating water allows for water collected to be selectively distributed by the at least one pumping means and the at least one distribution for meeting water supply and/or energy demands.

According to yet another embodiment, a method for regulating regional water demands is disclosed comprising:

collecting water during periods of high run-off;

distributing water to at least one high elevation reservoir during periods of high run-off and low water supply demand;

distributing water from the at least one high elevation reservoir to at least one of a plurality of lower elevation reservoirs during periods of low water run-off and high electrical power demand; and utilizing at least a portion of the water distributed in either of the two preceding steps for generating renewable energy; and providing the renewable energy and water distributed in the preceding step to multiple areas in the region.

Various embodiments of the present disclosure are set forth in the attached figures and in the detailed description of the invention as provided herein. It should be understood, however, that this Summary of the Invention may not contain all of the aspects and alternative embodiments of the present disclosure, which is not meant to be limiting or restrictive in any manner, and that the invention as disclosed herein is and will be understood by those of ordinary skill in the art to encompass obvious equivalents, improvements and modifications thereto.

Additional advantages of the present invention will become readily apparent from the following discussion, particularly when taken together with the accompanying drawings.

BRIEF DESCRIPTION OF THE DRAWINGS

The drawings are not necessarily to scale.

DETAILED DESCRIPTION

As described in detail below, various embodiments of the present invention include at least one high elevation reservoir and multiple lower elevation reservoirs. The system of reservoirs may be combined with multiple conduits connecting lower elevation reservoirs to at least one high elevation reservoir, pumping stations for distributing water between lower elevation reservoirs and at least one high elevation reservoir, and hydroelectric power generation facilities may be further provided at one or more locations. The term "reservoir" is expressly understood to be defined to mean a location for storing water, either on or above ground surface or underground, which may include but is not limited to basins, reservoirs, lakes, ponds, levies, holding tanks, water towers, aquifers, and other structures for holding and retaining water. The term "conduit" is expressly understood to be defined to mean a path for distributing water, either on or above ground surface or underground, which may include but is not limited to conduits, pipes, tubes, troughs, tunnels, rivers, streams, creeks or other means for distributing water. The term "water" shall have its ordinary meaning, except to the extent it shall, as used herein, expressly be understood to include both existing water supply as well as water collected from run-off, such as rain water, well water and snow melt, and may be supplied from other areas besides the area where the high elevation reservoir and lower elevation reservoirs would collect water such as by run-off.

Figure 1:
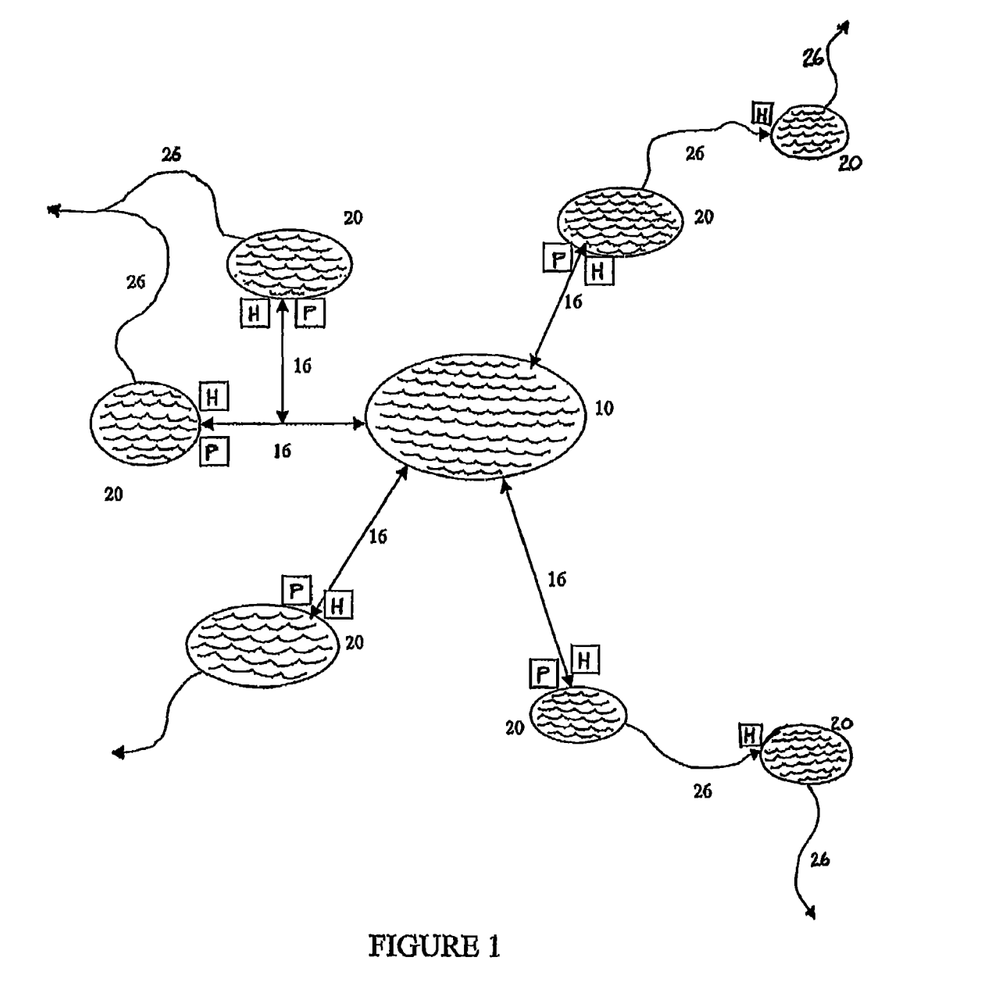
FIG. 1 is a schematic diagram of the system according to one particular embodiment of the present disclosure.

Referring now to the drawings, FIG. 1 depicts a schematic diagram of the system comprising a high elevation reservoir 10 connected to lower elevation reservoirs 20 by way of multiple conduits 16, which allow water collected in any one of the lower elevation reservoirs 20 to be distributed to the high elevation reservoir 10, as described in greater detail below. In a preferred embodiment, the high elevation reservoir 10 is centrally located to accommodate circulation and distribution of water between multiple lower elevation reservoirs 20 without increasing the demand for conduits between the high elevation reservoir 10 and any one of the lower elevation reservoirs 20, and without increasing the demand for additional and unnecessary pumping means in order to distribute the water from lower elevation reservoirs 20 to the high elevation reservoir 10.

According to various embodiments disclosed herein, pumping means shall be defined to include pumps, reversible pumps, centrifugal pumps, turbine pump, gravity pumps, gravity siphons, reverse gravity siphons, and/or any other apparatus for pumping water or other fluid from a first lower elevation location to a second higher elevation location. According to various embodiments disclosed herein, distribution means shall be defined to include any of the apparatus listed above in relation to pumping means, and further include valves, gates, spillways, tunnels, channels, weirs, levies, and/or other apparatus for releasing water from a first higher elevation location to a second lower elevation location.

Referring again to FIG. 1, the system according to one embodiment includes other lower elevation reservoirs 20 which may be served by one or more of the plurality of lower elevation reservoirs 20, although not necessarily connected by conduits 16. These further lower elevation reservoirs 20 may be located in the same river basin as upstream lower elevation reservoirs 20 and connected by water flow paths 26 that can further supply water from a first elevation reservoir 20 to a downstream lower elevation reservoir 20. In addition, hydroelectric power generation facilities H may be provided at upstream or downstream locations to these further lower elevation reservoirs 20, as shown in FIG. 1. Even further downstream lower elevation reservoirs (not shown) may be further included in the system according to one embodiment, thereby increasing the region's area in which water and/or energy may be distributed.

Figure 2:
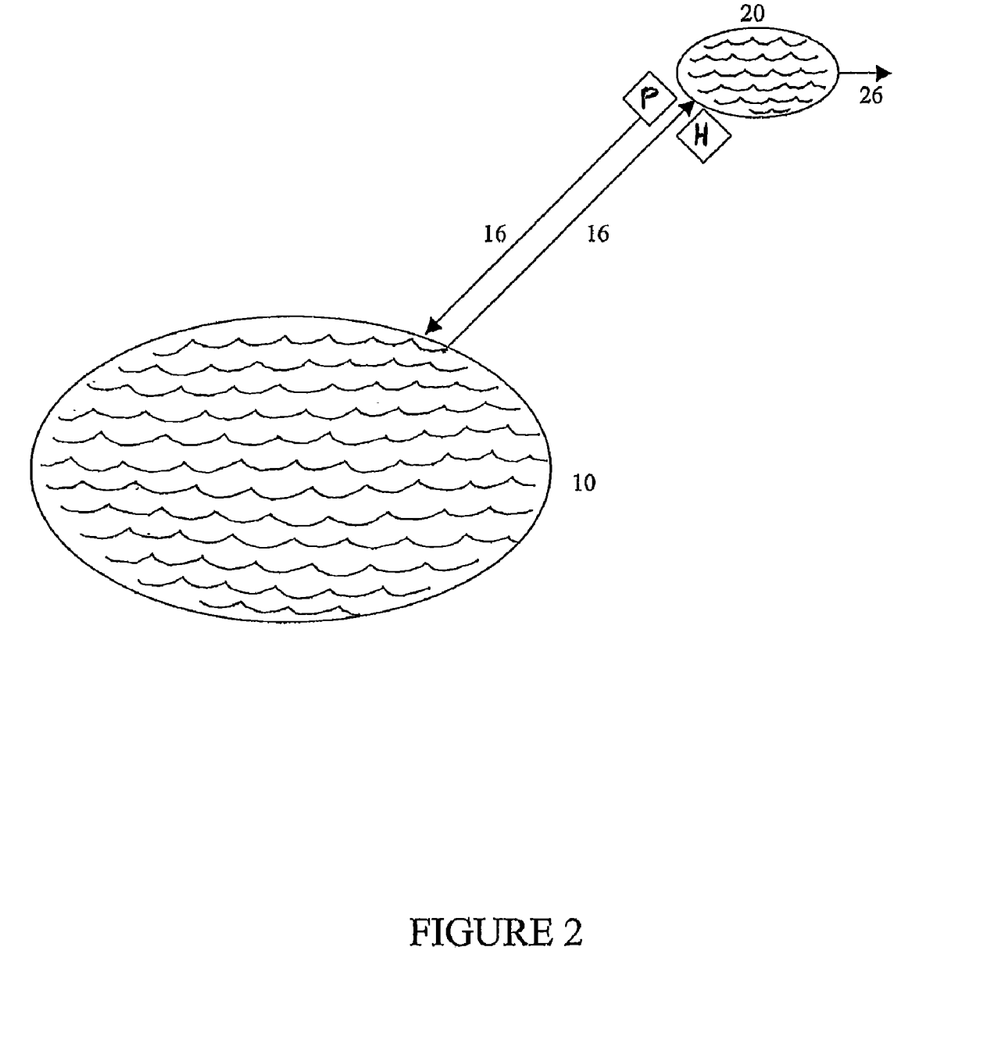
FIG. 2 is a partial block diagram of the system of FIG. 1.

Referring now to FIG. 2, conduits 16 may be located substantially directly between the high elevation reservoir 10 and each lower elevation reservoir 20, but may also be located so as to intersect with other conduits 16, as shown in FIG. 1. The conduits 16 serve as pathways for distributing water, either from the high elevation reservoir 10 to any of the lower elevation reservoirs 20, or from any of the lower elevation reservoirs 20 to the high elevation reservoir 10, or in alternate embodiments between two or more high elevation reservoirs 10. Conduits 16 may be either unidirectional or bidirectional with respect to water flow. Although the conduits 16 in a preferred embodiment serve to distribute water from the high elevation reservoir 10 to each of the lower elevation reservoirs 20, it is also contemplated that certain lower elevation reservoirs 20 may not distribute water directly to the high elevation reservoir 10, but rather may be connected to the closest other lower elevation reservoir 20 via a conduit 16. The water distributed to the lower elevation reservoirs 20 may further supply and distribute water to even lower elevations by way of water flow paths 26 of various types described in the summary above. In alternative embodiments, lower elevation reservoirs 20 may be further connected to additional reservoirs (not shown in FIG. 1) at still lower elevations than those of each of the lower elevation reservoirs 16 that distribute to those still lower elevations.

In various embodiments of the present disclosure herein is provided a system and method for circulating water between a lower elevation and a higher elevation to maximize the potential renewable energy from headwater at a higher elevation during periods of peak demand. As shown in the diagram of FIG. 2, the system in a preferred embodiment incorporates the use of pumping means such as pumping stations P, which may distribute water from the lower elevation reservoirs 20 to the higher elevation reservoir 10 via the conduits 16. Alternatively, the pumping stations P may also distribute water from the high elevation reservoir 10 to another high elevation reservoir (not shown in FIG. 2) or to lower elevation reservoirs 20 in the same fashion. Once the water has been distributed, hydroelectric power generation facilities H may be employed to generate a source of renewable energy.

The system in a preferred embodiment allows water to be distributed between the lower elevation reservoirs 20 and the high elevation reservoir 20 during periods of low electrical demand and high water runoff. The water pumped to the higher elevation reservoir 10 may subsequently be used more efficiently during periods of high water or electrical demand and low water runoff, and in particular may be distributed to multiple lower elevation reservoirs 20 depending on the requirements for the areas those lower elevation reservoirs 20 serve, including area served by water flow paths 26 at still lower elevations than the lower elevation reservoirs 20. The system thus provides the inter-connectivity between at least one high elevation reservoir 10 and multiple lower elevation reservoirs 20 to distribute water to achieve an efficient source of hydroelectric power, and also to provide water supply to a larger geographical area depending on the demands for the areas served by each of the lower elevation reservoirs 20. This geographical area is further expanded, as described above, when additional downstream lower elevation reservoirs 20 are included in the system of FIG. 1.

In use, the system, according to the embodiment of FIGS. 1 and 2, allows water collected by the high elevation reservoir 10 and the lower elevation reservoirs to be used for either supplying water to areas where such volume of water would not otherwise be available, or providing water to produce greater hydroelectric energy than would otherwise be achievable, or both. To illustrate, the system, with its network of reservoirs, allows water to be collected and distributed during periods of high run-off, such as the late winter and early spring months. The water from these high run-off months may be collected in the high elevation reservoir, but more typically will be collected by the multiple lower elevation reservoirs. In order to prevent overfilling of the lower elevation reservoirs, and also to avoid potential flooding or other losses caused by the excess water collected in the lower elevation reservoirs, the pumping stations distribute the water from the lower elevation reservoirs to the high elevation reservoir, where the collection area is sufficient to accommodate for large volumes of water circulating from multiple lower elevation reservoirs. At the higher elevation, the evaporative losses will be minimized, and a greater volume of water may be preserved for use during low run-off months, such as the late spring, summer and early fall months. During these low run-off periods the demand for electrical power is typically increased, thus creating a greater demand for renewable energy sources. Water contained in the high elevation reservoir may be released into the conduits or to existing pathways for water to flow to the lower elevation reservoirs, to provide water for generating power at the hydroelectric generation facilities. The potential of both the water supply and renewable energy is multiplied by preserving the water during high run-off months, and supplying the water/energy necessary for the areas served by the lower elevation reservoirs. In addition, the system provides for water to be circulated in multiple directions, depending on the requirements for the combined area served by the system of the present invention. Similarly, water supply demands can be met more efficiently by the present system, which allows water to be collected in one area and redistributed in another area that otherwise would not have the volume of water available.

Figure 3:
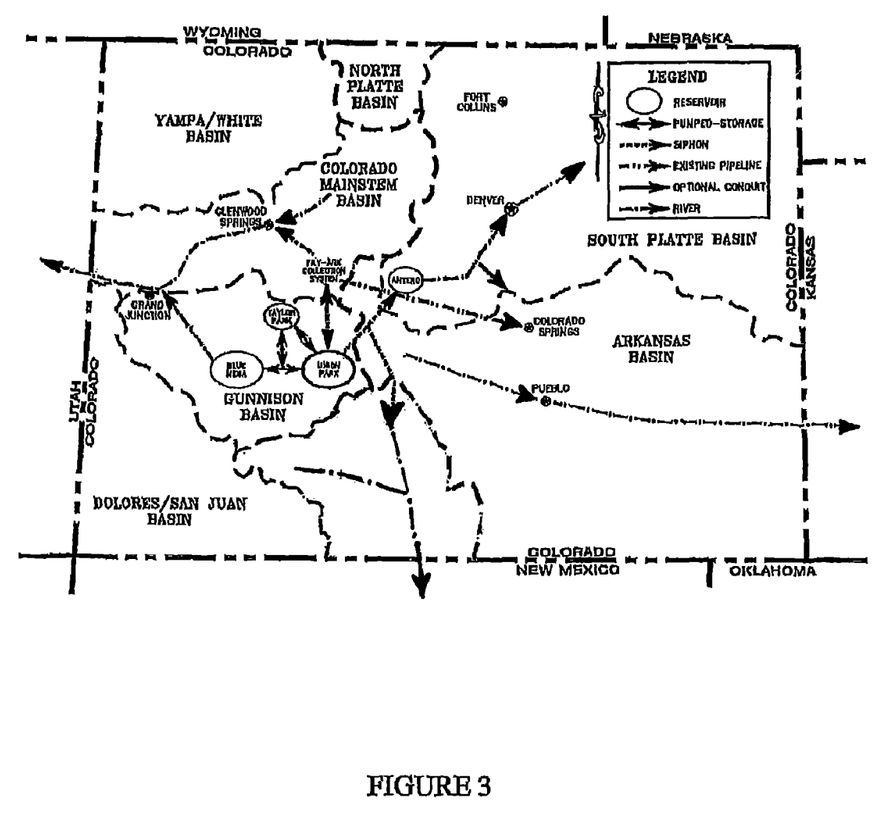
FIG. 3 is a plan view of a system according to one particular embodiment of the present disclosure.

Referring now to FIG. 3, a plan view of the system according to one particular embodiment of the present disclosure is shown. FIG. 3 shows a series of river valleys located in the state of Colorado and surrounding areas, with reservoirs for storing water collected in the region, pumped storage equipment for distributing water collected in the region, siphons for distributing water collected in the region, including existing pipe lines, as well as conduits and optional conduits for distributing water to lower elevations. As seen in FIG. 3, a centrally located first reservoir may distribute water in either direction between a plurality of secondary reservoirs by way of pumping means (not shown in FIG. 3), including secondary reservoirs on either side of the Continental Divide. These secondary reservoirs feed into rivers, conduits or other flow paths for supplying water and/or hydroelectric power from the water collected to the region. According to this embodiment, water collected through the series of secondary reservoirs may be pumped via pumping means and stored at a first central reservoir during periods of high run-off and low water demand. Subsequently, water stored at the first central reservoir may be distributed to secondary reservoirs on either side of the Continental Divide, depending on the region's water and energy demands, or other factors. Such other factors may include, by way of example but not limitation, water rights that have been assigned to down-stream states such as those states served by the Colorado River, the Arkansas River, or the South Platte River. According to the embodiment shown in FIG. 3, the water may be diverted to one of a plurality of secondary reservoirs by distribution means (not shown in FIG. 3) for providing a source of renewable energy, such as by providing at least one hydroelectric generation facility at or near each of the secondary reservoirs.

Thus, during periods of relatively low run-off and high energy demands (i.e., during the relatively dry and warm summer months) water may be distributed by distribution means from the first central reservoir to any of the particular secondary reservoirs for using the water in a hydroelectric facility. By distributing the water from a first central reservoir to multiple downstream secondary reservoirs, the collective potential of the water is thereby preserved, and the efficiency of the system, by supplying the precise water/energy supply demands for each area in the region, is maximized. This is accomplished in part by distributing the water to a higher elevation by pumping means, where lower evaporative losses will be experienced during periods of drought or low precipitation. Furthermore, the efficiency of such a system is also increased in part by allowing water to be distributed via distribution means from one collection area, such as a river valley, located in a particular area in the region to another area of the region such as an area on the other side of the Continental Divide, where the water collection may be less favorable. Referring in detail to FIG. 3, selective distribution means may occur between any of the secondary reservoirs via the first central reservoir, thus distributing the water as needed as a particular area's demands may require from season to season.

By way of further illustration but not limitation, a large, high elevation off-river reservoir, located in the rocky mountain region of the United States at approximately 10,000 feet altitude, may be filled via high-capacity reversible pump generators from existing reservoirs, such as the Blue Mesa and Taylor Park reservoirs, located at 7,393 and 9,319 feet, respectively. The filling operation may occur during heavy spring snowmelt months, when surplus energy and floodwaters are abundantly available for high-altitude pumped storage. The storage capacity of the high elevation reservoir is sufficiently large enough to provide adequate water storage during these heavy spring snowmelt months. This system then allows for the conversion of surplus, and currently wasted water into available potential hydroelectric peaking power for the western states power grid. This system also provides back-up peaking power essential to prevent regional brown and blackouts during high demand summer cooling and winter heating months. Reliable peaking power can have system-wide values up to ten times regular base power values.

Continuing with this example, after collection has taken place and water is stored in the high elevation reservoir; managed water releases and dependable river flows may further improve hydroelectric power generation yields from existing down river dams throughout the Gunnison, Colorado, Platte, Arkansas, and Rio Grande River basins. Some of the smaller down-river dams, which may not be equipped with hydroelectric power generation facilities power, may be economically upgraded to provide clean renewable energy, after the system has been implemented.

In this example illustrated above, a single high-altitude reservoir and advanced pumped-storage operation located near the Continental Divide of North America can integrate, regulate, and multiply water resource benefits throughout the southwestern United States five largest river basins. In addition, the control of water and power during periods of low run-off and high evaporation, as well as during periods of extremely high run-off benefits not only those states encompassing the region, such as Colorado, but furthermore benefits multiple states down river. Utah, Arizona, Nevada, California, New Mexico, Texas, Kansas, Oklahoma, Arkansas, Nebraska, and Wyoming would potentially benefit from greater regulation and control of water collection and storage in an embodiment of the present invention.

Figure 4:
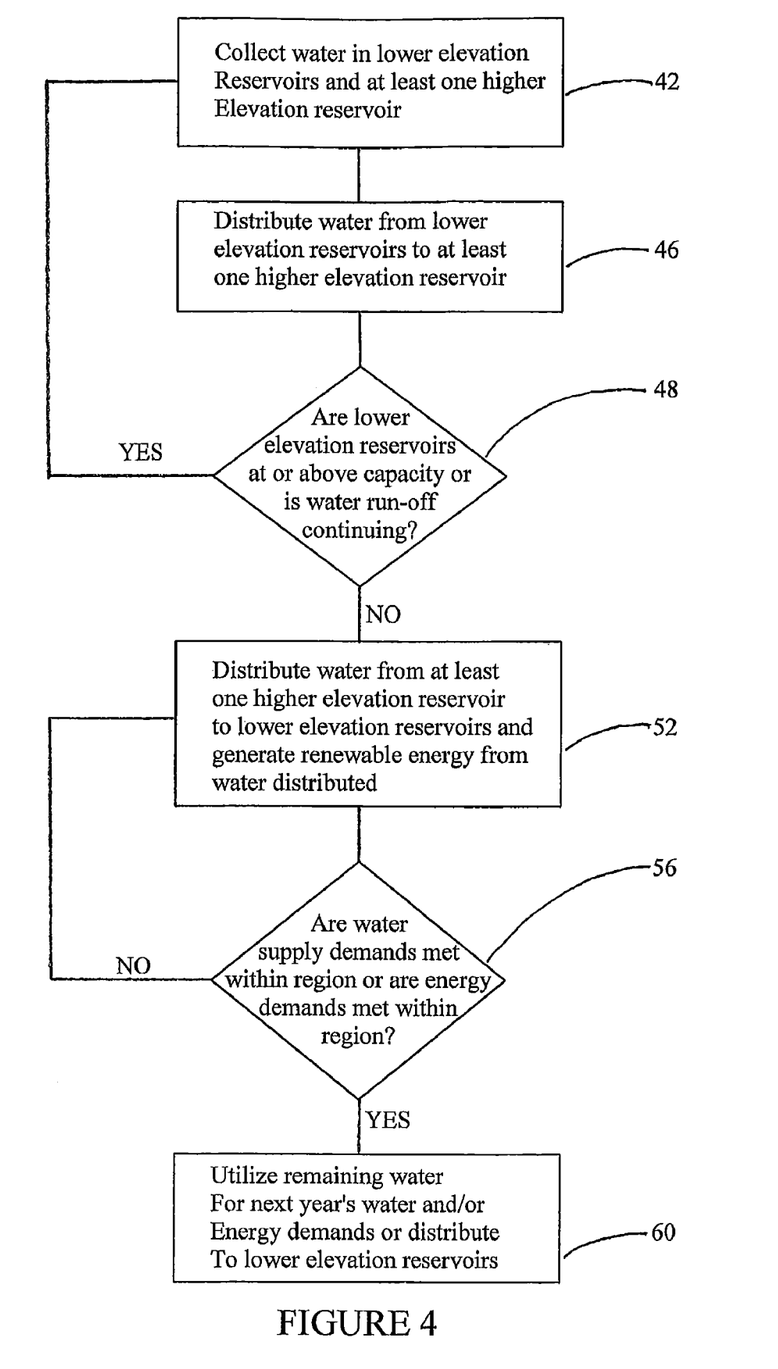
FIG. 4 is a flow-chart diagram of the method according to one particular embodiment of the present disclosure.

Referring now in detail to FIG. 4, a method for providing peak power is also disclosed herein. In a preferred embodiment, the method is comprised of steps, commencing with collecting water 42 during periods of high run-off, such as the late winter and early spring months. In the second step, the water collected in the previous step is distributed to the high elevation reservoir 46 preferably by pumping stations, which in a preferred embodiment are located at each of the lower elevation reservoirs. The high elevation reservoir, as described above, is preferably located in an area sufficient to accommodate for large volumes of water being distributed from multiple lower elevation reservoirs. At the higher elevation, the evaporative losses will be minimized, and a greater volume of water may be preserved for use during low run-off months, such as the late spring, summer and early fall months. The first and second step described above are repeated 48 to maintain the lower elevation reservoirs at or below capacity and throughout the spring/summer seasonal run-off period. In the third step 52, the water is distributed to the lower elevation reservoirs, typically during low run-off periods, which is when the demand for electrical power is traditionally the greatest. The potential created by the water is increased by preserving the water during the high run-off months and supplying the water necessary for the areas served by the lower elevation reservoirs. Water contained in the high elevation reservoir may be released during this third step into the conduits or to existing pathways for water to flow to the lower elevation reservoirs, in part to provide water for generating power, preferably via one or more hydroelectric generation facilities.

This third step 52 is continued until all water supply and/or energy demands within the various areas in the region have been met, and may continue even beyond those two conditions. The final step 60 allows the system to reestablish the lower capacity in the at least one higher elevation reservoir necessary for the next seasonal cycle, and beginning again with the first step 42 during the following winter/spring season. Alternatively, any remaining water may be maintained in the at least one high elevation reservoir until the following winter/spring season.

In this preceding example, not only is the total volume of water collected by the high elevation reservoir and the lower elevation reservoirs available for each distinct river basin and associated geographic area the lower elevation reservoirs serve, but the overall volume of water collected may be more efficiently distributed to meet the demands of a particular lower elevation reservoir. As each lower elevation reservoir provides a renewable energy source, such as hydroelectric power, to the power grid, at the same time water conservation efforts are implemented to avoid losing any potential of water diverted for other water requirements, such as agricultural requirements or down river water rights.

A number of variations and modifications of the invention may be accomplished without departing from the novel system and method disclosed above. It would be convenient, and potentially more efficient or productive, in certain environments, to provide for some features of the invention without providing others. For example, in one alternative embodiment, there is more than one high elevation reservoir which may or may not distribute water to every multiple lower elevation reservoir, or to the other high elevation reservoir. In yet another alternative embodiment, the high elevation reservoir is located underground, to further reduce evaporative loses during the summer months. In another embodiment, one or more of the lower elevation reservoirs are located underground, and with corresponding conduits which may be at least partially underground. In another alternative embodiment, the high elevation reservoir is not centrally located, yet still remains connected via conduits to multiple lower elevation reservoirs.

The present disclosure includes elements, methods, processes, systems and/or apparatus substantially as depicted and described herein, including various embodiments, combinations, subcombinations, and subsets thereof. Those of skill in the art will understand the present system and method after reviewing the disclosure herein. The system and method, in various embodiments, discloses certain embodiments in the absence of items not depicted and/or described herein or in various embodiments hereof, including in the absence of items such as reverse-siphons, hydroelectric power generation equipment, electrical and mechanical controls for selectively distributing water, and other items which are sufficiently well known from previously disclosed systems or methods.

To provide further clarity to the detailed description provided herein in the associated drawings, the following list of components and associated numbering are provided as follows:

| Reference Number | Component |
| --- | --- |
| 10 | High Elevation Reservoir |
| 16 | Conduits |
| 20 | Lower Elevation Reservoirs |
| 26 | Water Flow Paths |
| 42 | Step one of Method |
| 46 | Step two of Method |
| 52 | Step three of Method |
| 60 | Step four of Method |
| P | Pumping Stations |
| H | Hydroelectric Power Generation Facilities |

The foregoing description of the present disclosure has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications to the system and method disclosed herein are within the scope of the invention, e.g., as may be within the skill and knowledge of those in the art, after understanding the present disclosure. It is intended to obtain rights that include alternative embodiments to the extent permitted, including alternate, interchangeable and/or equivalent structures or steps to those disclosed.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such a manner, or include other embodiments with various modifications as required by the particular application(s) or use(s) of the present invention. Thus, it is intended that the appended claims be construed to include alternative embodiments to the extent permitted by the prior art.

What is claimed is:

1. A system for storing and selectively dispersing water between reservoirs located in distinct drainage basins, comprising:
at least one main reservoir at a first elevation above sea level;
a plurality of secondary reservoirs located at elevations lower than the first elevation but still above sea level;
a plurality of conduits connecting the at least one main reservoir and the plurality of secondary reservoirs;
pumping means for distributing water through the plurality of conduits;
generation means for generating electrical power from water distributed to/from the at least one main reservoir and/or from water distributed to/from the plurality of secondary reservoirs;
wherein the water in the at least one main reservoir is selectively distributed to the plurality of secondary reservoirs to provide water and/or generate power;
wherein the water in the plurality of secondary reservoirs is selectively distributed to the main reservoir to conserve water and reduce water levels at the plurality of secondary reservoirs;
wherein at least a portion of the water in the plurality of secondary reservoirs is pumped to the at least one main reservoir during periods of high run-off and/or low power demand to reduce water losses; and
wherein at least a portion of the water in the at least one main reservoir is released through at least one of the plurality of conduits and distributed to at least one of the plurality of secondary reservoirs during periods of low run-off and/or high power demand to satisfy a water and/or power demand.

2. The system of claim 1, wherein the plurality of conduits are selected from the group consisting of a pipe, a stream bed, a river basin, a man-made channel and a tunnel.

3. The system of claim 1, wherein the pumping means comprises a plurality of reversible pumps.

4. The system of claim 1, wherein the pumping means comprises a plurality of reversible gravity siphons.

5. The system of claim 1, wherein the generation means comprises at least one hydroelectric generator connected to any one of the plurality of conduits.

6. The system of claim 1, wherein the at least one main reservoir at a first elevation is comprised of a plurality of reservoirs connected by at least one conduit.

7. A system for regulating water collected from various sources comprising:
at least one first reservoir at a first elevation at least 5,000 feet above sea level;
a plurality of secondary reservoirs at elevations above sea level but lower than the first elevation;

at least one conduit connecting the at least one first reservoir and the plurality of secondary reservoirs;

at least one pumping means associated with each of the plurality of secondary reservoirs for selectively distributing water from each of the plurality of secondary reservoirs to the at least one first reservoir;

at least one distribution means associated with each of the at least one conduits for selectively distributing water from the at least one first reservoir to the plurality of secondary reservoirs;

wherein the system for regulating water allows for water collected to be selectively distributed by the at least one pumping means and the at least one distribution means for meeting water supply and/or energy demand;

wherein, with the at least one pumping means, water from the plurality of secondary reservoirs is pumped to the at least one first reservoir during periods of high water run-off and low energy demand such that evaporative losses are reduced and potential hydroelectric energy is increased; and wherein water from the at least one first reservoir is selectively released to the plurality of secondary reservoirs through the at least one conduit during periods of low water run-off and/or high energy and water demands.

8. The system of claim 7, wherein the at least one conduit is a pipe, a stream bed, a river basin, a man-made channel and a tunnel.

9. The system of claim 7, wherein the at least one pumping means comprises at least one reversible gravity siphon.

10. The system of claim 7, wherein the at least one pumping means comprises at least one reverse-siphon.

11. The system of claim 7, wherein the renewable energy is generated at least in part by hydroelectric power generators.

12. The system of claim 7, wherein said water in the at least one first reservoir may be selectively distributed to said plurality of secondary reservoirs to provide water and/or hydroelectric power during at least one of July, August and September, and wherein said water in said plurality of secondary reservoirs may be distributed to the at least one first reservoir to provide water during at least one of April, May and June.

13. The system of claim 7, wherein the at least one first reservoir is comprised of a plurality of reservoirs connected by at least one conduit.

14. A system for regulating water collected from various sources comprising:

at least one first reservoir at a first elevation above 10,000 feet above sea level;

a plurality of secondary reservoirs at elevations above sea level but lower than the first elevation;

at least one conduit connecting the at least one first reservoir and the plurality of secondary reservoirs;

at least one pumping means associated with each of the plurality of secondary reservoirs for selectively distributing water from each of the plurality of secondary reservoirs to the at least one first reservoir;

at least one distribution means associated with each of the at least one conduits for selectively distributing water from the at least one first reservoir to the plurality of secondary reservoirs; and wherein the system for regulating water allows for water collected to be selectively distributed by the at least one pumping means and the at least one distribution for meeting water supply and/or energy demand;

wherein the at least one conduit is a pipe, a stream bed, a river basin, or a man-made channel, wherein the at least one pumping means comprises at least one reversible gravity siphon, wherein the renewable energy is generated at least in part by hydroelectric power generators; and wherein said water in the at least one first reservoir is selectively distributed to said plurality of secondary reservoirs to provide water and/or hydroelectric power during periods of high water and/or energy demand in the late spring, summer, and early fall months, and wherein said water in said plurality of secondary reservoirs is distributed to the at least one first reservoir to store water during periods of low regional energy and/or water demands and high water run-off in the late winter and early spring months.

15. A method for improving the utility and productivity of regional water storage systems and regulating regional water and energy demands, comprising:

A. collecting water in at least one of a plurality of lower elevation reservoirs during periods of high water run-off;

B. distributing water from at least one of the plurality of lower elevation reservoirs to at least one high elevation reservoir located above about 10,000 feet during periods of high water run-off and low water demand by a network of existing water conduits that connect at least one of the plurality of lower elevation reservoirs to at least one high elevation reservoir;

C. distributing water from the at least one high elevation reservoir to the at least one of a plurality of lower elevation reservoirs during periods of low water run-off and high electrical power demand; and utilizing at least a portion of the water distributed in either of the two preceding steps for generating renewable hydroelectric energy;

D. providing the renewable energy and water distributed in the preceding step to multiple areas in the region; and E. selectively distributing water from at least one of the plurality of lower elevation reservoirs located in a first area to at least another of the plurality of lower elevation reservoirs located in a second area via the at least one high elevation reservoir and the network of existing water conduits to meet water demand needs of the second area.

16. The method for regulating regional water and energy demands of claim 15, further comprising the steps of:

E. distributing water from at least one of the plurality of lower elevation reservoirs to multiple secondary reservoirs downstream from the at least one of the plurality of lower elevation reservoirs; and F. providing renewable energy and water distributed in the preceding step to multiple areas where the secondary reservoirs are located.

* * * * *